April 18, 1967 E. ORSHANSKY, JR 3,314,234
HYDROMECHANICAL TRANSMISSION
Filed Oct. 7, 1965 3 Sheets-Sheet 3

INVENTOR.
ELIAS ORSHANSKY, JR.

BY
ATTORNEYS

United States Patent Office 3,314,234
Patented Apr. 18, 1967

3,314,234
HYDROMECHANICAL TRANSMISSION
Elias Orshansky, Jr., 1811 Trousdale Drive,
Burlingame, Calif. 94010
Filed Oct. 7, 1965, Ser. No. 493,665
3 Claims. (Cl. 60—53)

This invention relates to a hydromechanical transmission. More specifically, the invention relates to a hydromechanical transmission, wherein the transmission operates as a purely mechanical drive at a 1:1 ratio, and wherein the device transmits the greater part of the power hydraulically operating at its maximum ratio.

Although hydromechanical transmissions have heretofore been known, they are ordinarily incapable of operating at high efficiency and utilize a large number of complex parts.

An object of the present invention is to provide a hydromechanical transmission which utilizes relatively few and simple parts.

Another object of this invention is to provide a hydromechanical transmission which operates at high efficiency.

Still another object of this invention is to provide a hydromechanical transmission having a novel valve arrangement, so that when the device is operating as a purely mechanical transmission, the reaction bearings of the motor are not under stress, thereby contributing to low wear and long life.

Further objects will be apparent from the balance of the specification.

In the drawings forming part of this application:

Figure 1:
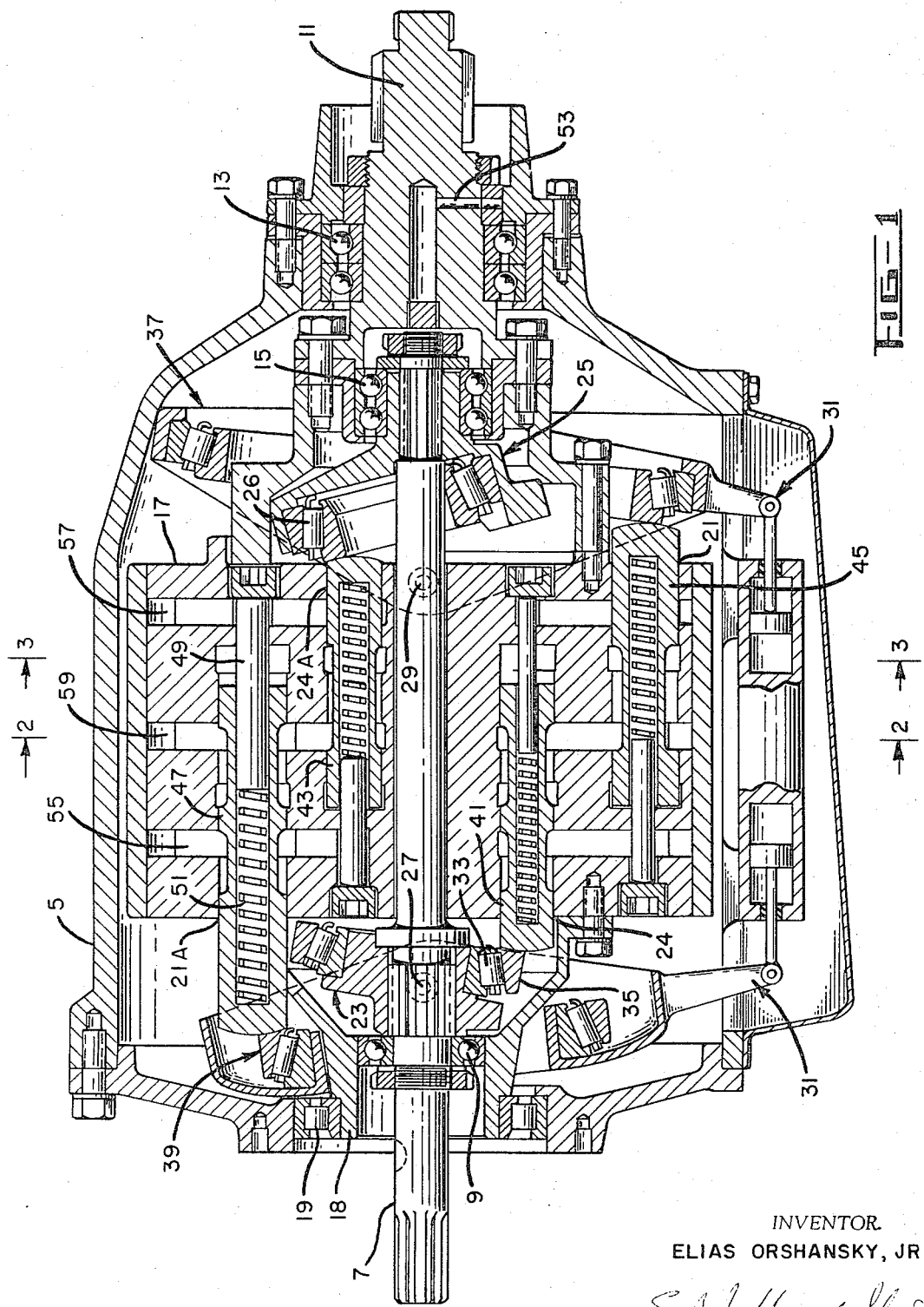
FIGURE 1 is a side view of a transmission embodying the present invention. In this view, for clarity of illustration, one end is shown 90° out of phase from the position which it would actually occupy in the unit.
Figure 2:
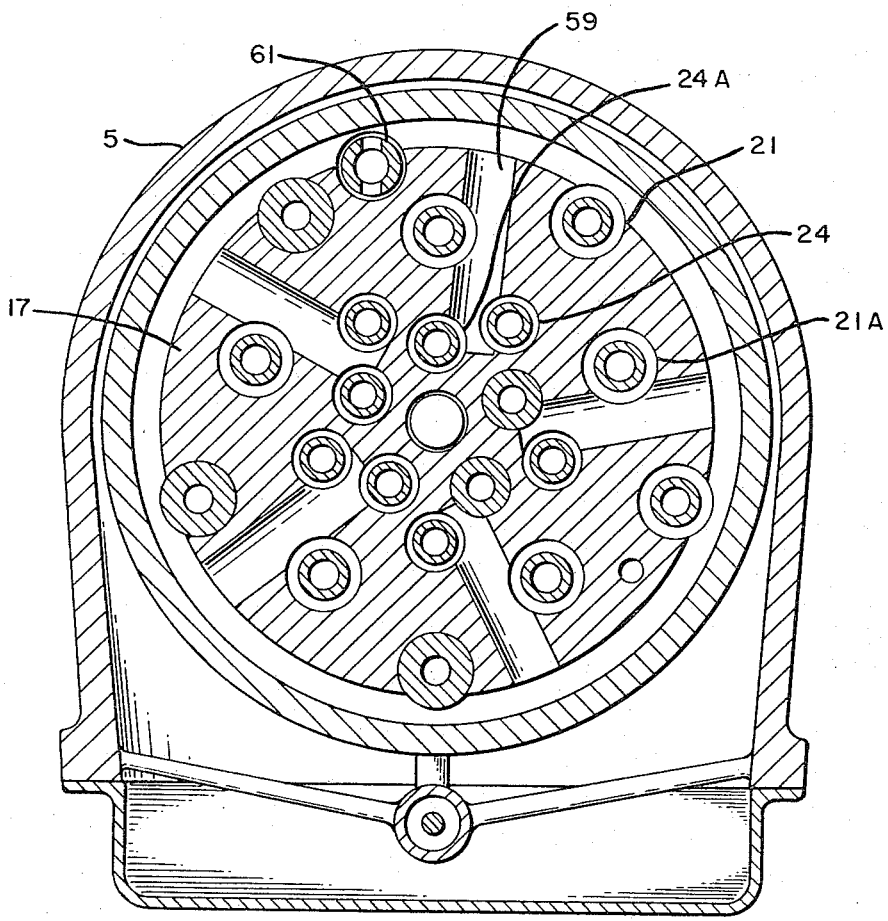
FIGURE 2 is a section on the line 2—2 of FIGURE 1.
Figure 3:
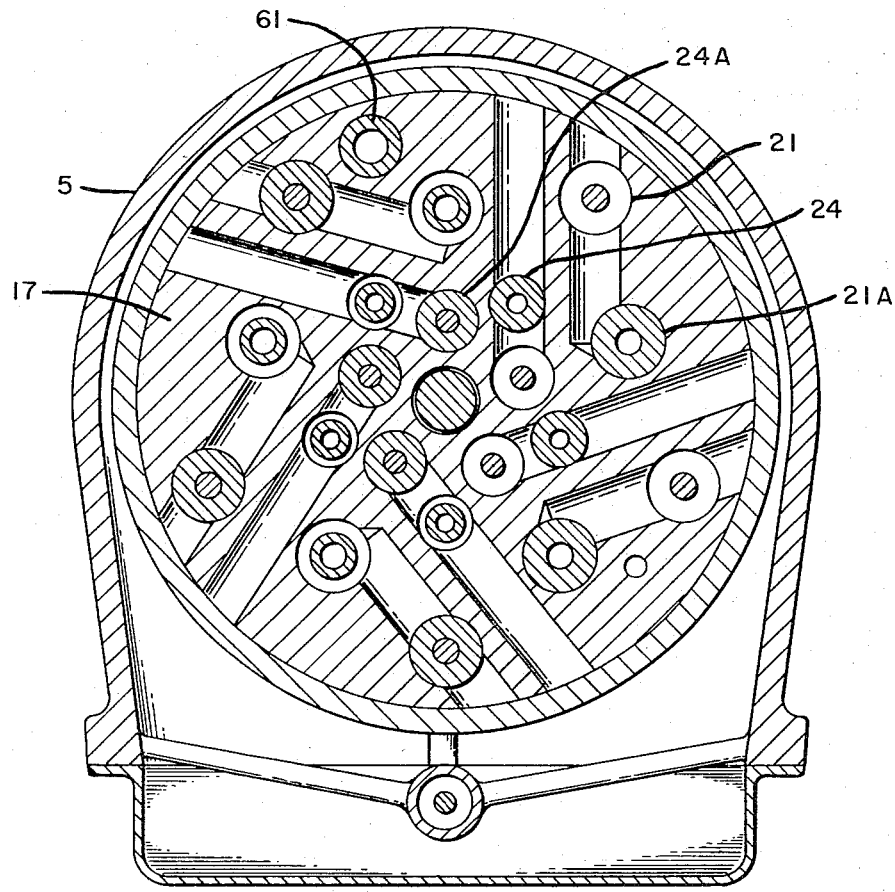
FIGURE 3 is a section on the line 3—3 of FIGURE 1.

Referring now to the drawings by reference characters, the device includes a fixed housing 5 having an input shaft 7 mounted on bearings 9 on support 18, the shaft extending from one end of the housing. An output shaft 11 extends from the opposite end of the housing and is mounted for rotation on the bearings 13 and 19. Bearings 15 support the inner end of the input shaft. The output shaft 11 is attached to the rotating cylinder block assembly 17 which has a support member 18 at the inner end thereof. The inner end of the support member 18 is mounted on bearings 19.

The cylinder block 17 includes two outer tiers of cylinders 21 and 21A and two inner tiers of cylinders 24 and 24A. As will be later apparent, the two inner tiers of cylinders form part of a pump while the outer two tiers of cylinders form part of a motor, i.e. the power take-off.

Mounted on the input shaft 7 are the fixed wobble plates 23 and 25. Wobble plate 23 includes an anti-friction bearing 33 having an outer race 35 which serves as a cam track for the take-off of power for actuating one tier of the pump pistons, while wobble plate 25 has a similar anti-friction bearing 26 but here the inner race serves as the cam track. Since the pistons 24A operate on a smaller circle than pistons 24, wobble plate 25 makes a greater angle to normal from shaft 7 than does wobble plate 23 to equalize piston travel.

For the power take-off, two variable wobble plates are provided, namely an outer wobble plate 37 and an intermediate wobble plate 39 which are set opposite the two outer tiers of cylinders, respectively. These two variable wobble plates are used to actuate the pistons of the power take-off portion of the mechanism and are tilted around the pivot points 27 and 29 by means of a mechanism generally designated 31. The exact tilting mechanism illustrated is only by way of an example and other tilting mechanisms may be employed. The inner wobble plate 39 is always set at a greater angle from normal to the shaft than is the outer wobble plate 37 in order to equalize piston travel in a manner similar to that described above in conjunction with the pump section.

The inner tiers of cylinders 24 and 24A, which constitute the pump portion of the assembly, comprises a series of pistons facing in alternate directions, i.e. against the two fixed wobble plates. Those pistons facing one of the wobble plates, as at 41, incorporate a three land valve structure, while those facing the opposite wobble plate, as at 43, incorporate a two land valve structure.

In the motor portion of the structure, the outermost tier of cylinders 21 is provided with two land driving pistons 45, all of which press against the wobble plate 37, while the next tier 21A is provided with three land valve pistons 47, all of which press against the wobble plate 39.

All of the pistons are provided with retractor rods, such as the one designated 49 for the piston 47, and a spring biases the pistons outwardly so that the pistons are always kept in contact with their respective wobble plates. In normal operation, a supercharge pressure is provided through line 53 which leads through other lines, not shown, to the low pressure lines so that the supercharge pressure normally serves to keep the pistons in contact with the wobble plates, the springs merely being a safety measure in case the supercharge pressure fails.

The valving arrangement will be apparent to those skilled in the art, and particularly by reference to my co-pending application entitled "Fixed Displacement Motor or Pump," Serial No. 489,823 filed September 24, 1965. In general, each of the pump pistons has a companion piston in the motor section, so that as one piston is pumping, another pump piston is in a position to valve the pumped oil into the space behind its companion power piston.

Two outer passages 55 and 57 serve as low pressure lines and are also connected to the source of supercharge pressure as described above, while the inner passage 59 serves as a high pressure line. A bypass valve 61 serves to connect the high and low pressure lines to provide for a neutral in the transmission.

An important aspect of the invention is the fact that the lands on the valves are of such size that the pressure lines can be completely blocked. Thus when the transmission is operating at a 1:1 ratio, there is no pressure on the wobble plates 39 and 37.

I claim:
1. A hydromechanical transmission comprising in combination:
(a) a fixed housing;
(b) an input shaft mounted in one end of said housing for rotation relative to said housing;
(c) an output shaft mounted in said housing for rotation relative to the housing and to the input shaft;
(d) a rotatable cylinder block mounted on the output shaft;
(e) four tiers of cylinders in said cylinder block, namely, first, second, third and fourth tiers counting outwardly from the input shaft;
(f) first and second fixed wobble plates mounted on said input shaft, one of said wobble plates having a cam surface lying adjacent the first tier of cylinders and the other of said wobble plates having a cam surface lying adjacent said second tier of cylinders;
(g) third and fourth variable wobble plates affixed to said housing and having cam surfaces adjacent the third and fourth tier of cylinders respectively;
(h) pump pistons in said first and second tier of cylinders;

(i) power pistons in said third and fourth tier of cylinders;
(j) means for varying the angle of said third and fourth wobble plates; and
(k) valving means whereby said pump pistons supply oil to said power pistons.

2. The structure of claim 1 wherein each of the pistons incorporates a spool valve and wherein each of the pump pistons acts as a valve for a companion pump piston and each of the power pistons acts as a valve for a companion power piston.

3. The structure of claim 2 wherein the spool valves have lands adapted to completely block the high pressure line whereby there is no pressure on the wobble plates when the transmission is operating at a 1:1 ratio.

No references cited.

EDGAR W. GEOGHEGAN, *Primary Examiner.*